(12) United States Patent
Gautam et al.

(10) Patent No.: US 10,977,355 B2
(45) Date of Patent: Apr. 13, 2021

(54) AUTHENTICATION METHOD AND DEVICE THROUGH FACE RECOGNITION

(71) Applicant: LG ELECTRONICS INC., Seoul (KR)

(72) Inventors: Sumit Gautam, Bangalore (IN); Ashish Tiwari, Bangalore (IN); Nitin Kumar, Bangalore (IN); Ramesha S, Bangalore (IN)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/663,232

(22) Filed: Oct. 24, 2019

(65) Prior Publication Data

US 2020/0057846 A1 Feb. 20, 2020

(30) Foreign Application Priority Data

Sep. 11, 2019 (IN) .............................. 201911036572

(51) Int. Cl.
*G06F 21/32* (2013.01)
*G06K 9/32* (2006.01)
*G06K 9/62* (2006.01)
*G06N 20/10* (2019.01)
*G06K 9/00* (2006.01)

(52) U.S. Cl.
CPC .......... *G06F 21/32* (2013.01); *G06K 9/00255* (2013.01); *G06K 9/3233* (2013.01); *G06K 9/6269* (2013.01); *G06N 20/10* (2019.01)

(58) Field of Classification Search
CPC .......... G06K 9/00221; G06K 9/00248; G06K 9/00268; G06K 9/00255; G06K 9/3233; G06K 9/6269; G06K 9/00281; G06K 9/00288; G06K 9/00885; G06F 21/32; G06N 20/10
See application file for complete search history.

(56) References Cited

U.S. PATENT DOCUMENTS

| | | | |
|---|---|---|---|
| 8,542,879 B1 * | 9/2013 | Nechyba | G06K 9/00228 382/103 |
| 2014/0307929 A1 * | 10/2014 | Nechyba | G06K 9/00906 382/118 |
| 2019/0080072 A1 * | 3/2019 | Van Os | G06F 3/04883 |
| 2019/0080155 A1 * | 3/2019 | Ganong | G06K 9/00261 |
| 2019/0087603 A1 * | 3/2019 | Dror | G16H 10/65 |
| 2019/0370583 A1 * | 12/2019 | Van Os | G06F 21/32 |

* cited by examiner

*Primary Examiner* — Paul E Callahan
(74) *Attorney, Agent, or Firm* — Birch, Stewart, Kolasch & Birch, LLP

(57) ABSTRACT

In the present disclosure, a request is received from a user to access the electronic device. Upon receiving the request, the user is prompted to perform an action and image frames are captured while the user performs the action. Next, a variation in characteristics of skin of the user is identified, while the user performs the action. The identification is performed using the image frames captured. Upon identification of the variation in the characteristic of the skin of the user, facial features of the user are recognized. The access is provided to the user based on recognition of the facial features.

16 Claims, 3 Drawing Sheets

AUTHENTICATION METHOD AND DEVICE THROUGH FACE RECOGNITION

CROSS-REFERENCE TO RELATED APPLICATIONS

This Application claims the benefit under 35 U.S.C. 119(a) to Patent Application No. 201911036572, filed in India on Sep. 11, 2019, the contents of which are all hereby incorporated by reference herein in their entirety.

FIELD OF THE INVENTION

The present disclosure relates to access control mechanism and in particular to providing secure access to an electronic device.

BACKGROUND OF THE INVENTION

An advance in technology has enabled access to an electronic device by way of biometric credentials of a user of the electronic device. The biometric credentials include fingerprint, facial feature recognition, voice recognition, and the like. Since biometric credentials are unique for each user, the access to the electronic device using the biometric credentials is considered secure.

However, hackers and identity thieves tend to replicate the biometric credentials of the user to access the electronic device. For example, in a scenario when facial feature recognition is required for unlocking mobile terminal, facial features of the user may be spoofed by way of a face mask having same facial features as that of the user. A person other than the authorized user may access the mobile terminal by wearing the face mask. Hence, conventional mechanisms of providing access to electronic devices using known biometric credentials are vulnerable to theft and security breach.

Accordingly, a need exists for a secure access mechanism that provides secure access to electronic devices.

SUMMARY OF THE INVENTION

The present disclosure overcomes the foregoing and other problems associated with providing secure access to an electronic device using biometric credentials of a user.

In an embodiment of the present disclosure, a request is received from a user to access the electronic device. Upon, receiving the request, the user is prompted to perform at least one action in response to the received request. In an embodiment of the present disclosure the at least one action is selected from a plurality of predefined actions stored in a repository. The plurality of predefined actions include face movement in one or more directions, one or more predefined facial expressions, and speaking one or more predefined text strings. Further, the one or more predefined facial expressions include raising eye brows, making a pout, winking of eyes and movement of mouth. Further, each predefined action of the plurality of the predefined actions corresponds to a predefined change in a predefined region of the skin of the user. The predefined change in the pre-defined region of the skin of the user is stored in the repository.

In an embodiment of the present disclosure, the prompting to the user is by at least one of: audio prompt and visual prompt.

In an embodiment of the present disclosure, one or more image frames are captured while the user performs the at least one action. The capturing of the one or more image frames terminates upon completion of the at least one action performed by the user. Further, the termination of the capturing of the one or more image frames occurs in a pre-defined time period.

Next, a variation in one or more characteristics of skin of the user is identified while the user performs the at least one action. The identification is performed using the one or more image frames captured. In an embodiment of the present disclosure, each predefined action of the plurality of the predefined actions corresponds to a predefined change in a predefined region of the skin of the user. Also, the predefined change in the pre-defined region of the skin of the user is stored in the repository. In an embodiment of the present disclosure, the identification of the variation in the characteristics of the skin of the user includes pre-processing of the captured image frames to determine a Region of Interest (ROI) corresponding to the at least one action performed by the user. The identification of the variation in the characteristics of skin of the user is based on identification of variation in characteristic of skin within the ROI.

In an exemplary embodiment, the capturing of the image frames terminates upon completion of identification of variation in the characteristics of the skin of the user. In an alternate embodiment, the capturing of the image frames terminates upon completion of the action performed by the user. In an example, the termination of the capturing of the image frames occurs in a pre-defined time period.

In an embodiment of the present disclosure, the variation in the characteristic of the skin within the ROI includes variation in physical characteristic of the skin within the ROI, chromatic characteristic of the skin within the ROI, or both. The variation in the physical characteristic of the skin within the ROI includes one of: stretch in the skin, stress in muscles corresponding to the skin within the ROI, and temporary wrinkles on the skin.

In an example, the variation in the physical characteristic of the skin within the ROI is identified by an algorithm, such as Multicast AdaBoost algorithm, Support Vector Machine (SVM) algorithm, Active shape model algorithm, skin color segmentation using fuzzy entropy algorithm, and a combination thereof. In another example, the variation in the physical characteristic of the skin within the ROI is identified by employing one or more deep learning algorithms, such as machine learning, fuzzy logic, convolutional neural network, and recurrent neural network.

In an embodiment of the present disclosure, the variation in the chromatic characteristic is identified by remote Photo PlethysmoGraphy (rPPG) analysis. The chromatic characteristic of the skin includes coloration of the skin of the user in correspondence with one or more cardiac cycle of the user.

Upon identification of the variation in the at least one characteristic of the skin of the user, one or more facial features of the user are recognized. Further, the access is provided to the user, based on the recognition of the one or more facial features.

In an embodiment of the present disclosure, a computer system facilitates a secure access to an electronic device. The computer system includes a microprocessor and a memory. The computer system also includes a user interaction module, an image capturing device, and a processing engine. The user interaction module receives, via the microprocessor, a request from a user to access the electronic device. Further, the user interaction module prompts, via the microprocessor, the user to perform at least one action in response to the request.

In an embodiment of the present disclosure the at least one action is selected from a plurality of predefined actions stored in a repository. The plurality of predefined actions include face movement in one or more directions, one or more predefined facial expressions, and speaking one or more predefined text strings. Further, the one or more predefined facial expressions include raising eye brows, making a pout, winking of eyes and movement of mouth. Further, each predefined action of the plurality of the predefined actions corresponds to a predefined change in a pre-defined region of the skin of the user. The predefined change in the pre-defined region of the skin of the user is stored in the repository.

In an embodiment of the present disclosure, the prompting to the user is by at least one of: audio prompt and visual prompt.

Next, the image capturing device is configured to capture one or more image frames while the user performs the at least one action. In an embodiment of the present disclosure, the image capturing device terminates capturing of the one or more image frames upon completion of the at least one action performed by the user. Further, the image capturing device terminates the capturing of the one or more image frames in a pre-defined time period.

Additionally, the processing engine is configured to identify, via the microprocessor, a variation, using the one or more image frames, in one or more characteristics of skin of the user while the user performs the at least one action. In an embodiment of the present disclosure, the processing engine identifies the variation in one or more characteristics of skin of the user by pre-processing of the one or more captured image frames to determine a Region of Interest (ROI) corresponding to the at least one action performed by the user. Further, the processing engine identifies the variation in one or more characteristics of skin of the user based on identification of variation in characteristic of the skin within the ROI.

In an embodiment of the present disclosure, the variation in the characteristic of the skin within the ROI includes variation in physical characteristic of the skin within the ROI, chromatic characteristic of the skin within the ROI, or both. The variation in the physical characteristic of the skin within the ROI includes one of: stretch in the skin, stress in muscles corresponding to the skin within the ROI, and temporary wrinkles on the skin.

In an example, the processing engine identifies the variation in the physical characteristic of the skin within the ROI by an algorithm, such as Multicast AdaBoost algorithm, Support Vector Machine (SVM) algorithm, Active shape model algorithm, skin color segmentation using fuzzy entropy algorithm, and a combination thereof. In another example, processing engine identifies the variation in the physical characteristic of the skin within the ROI by employing one or more deep learning algorithms, such as machine learning, fuzzy logic, convolutional neural network, and recurrent neural network.

In an embodiment of the present disclosure, processing engine identifies the variation in the chromatic characteristic by remote Photo PlethysmoGraphy (rPPG) analysis. The chromatic characteristic of the skin includes coloration of the skin of the user in correspondence with one or more cardiac cycle of the user.

In an exemplary embodiment, the image capturing device terminates capturing of the one or more image frames upon completion of identification of variation in the one or more characteristics of the skin of the user.

Also, the processing engine recognizes, via the microprocessor, one or more facial features of the user upon identification of the variation in the at least one characteristic of the skin of the user. Further, the processing engine facilitates, via the microprocessor, the access to the user based on recognition of the one or more facial features.

In an embodiment of the present disclosure, the user interaction module, the image capturing device, and the processing engine are communicatively coupled to each other through one of: a wired communication protocol and a wireless communication protocol.

Thus, the present disclosure performs an additional verification of identifying if there is a variation in skin of the user while performing an action. The identification of the variation in the skin is carried to ensure liveliness of skin of the user. Thus, the identification overcomes the drawback of conventional biometric credential based access mechanisms by eliminating a possibility of spoofing of facial features using a face mask. This is achieved as the variation in the characteristics of the skin is observed only for live skin of the user. A face mask made of artificial material may not show variation in characteristics. Once the probability of spoofed facial features is reduced, the present disclosure proceeds for recognition of facial features of an authorized user, similar to known biometric credential mechanisms. Since the present disclosure provides a two-step mechanism of providing access to the electronic device, whereby probability of identity theft is reduced, the present disclosure provides a secure access to the electronic device compared to conventional biometric credential based mechanisms.

DETAILED DESCRIPTION OF DRAWINGS

The following disclosure is provided in order to enable a person having ordinary skill in the art to practice the disclosure. Exemplary embodiments are provided only for illustrative purposes and various modifications will be readily apparent to persons skilled in the art. The general principles defined herein may be applied to other embodiments and applications without departing from the spirit and scope of the disclosure. Also, the terminology and phraseology used is for the purpose of describing exemplary embodiments and should not be considered limiting. Thus, the present disclosure is to be accorded the widest scope encompassing numerous alternatives, modifications and equivalents consistent with the principles and features disclosed. For the purpose of clarity, details relating to technical material that is known in the technical fields related to the disclosure have not been described in detail so as not to unnecessarily obscure the present disclosure.

Figure 1:
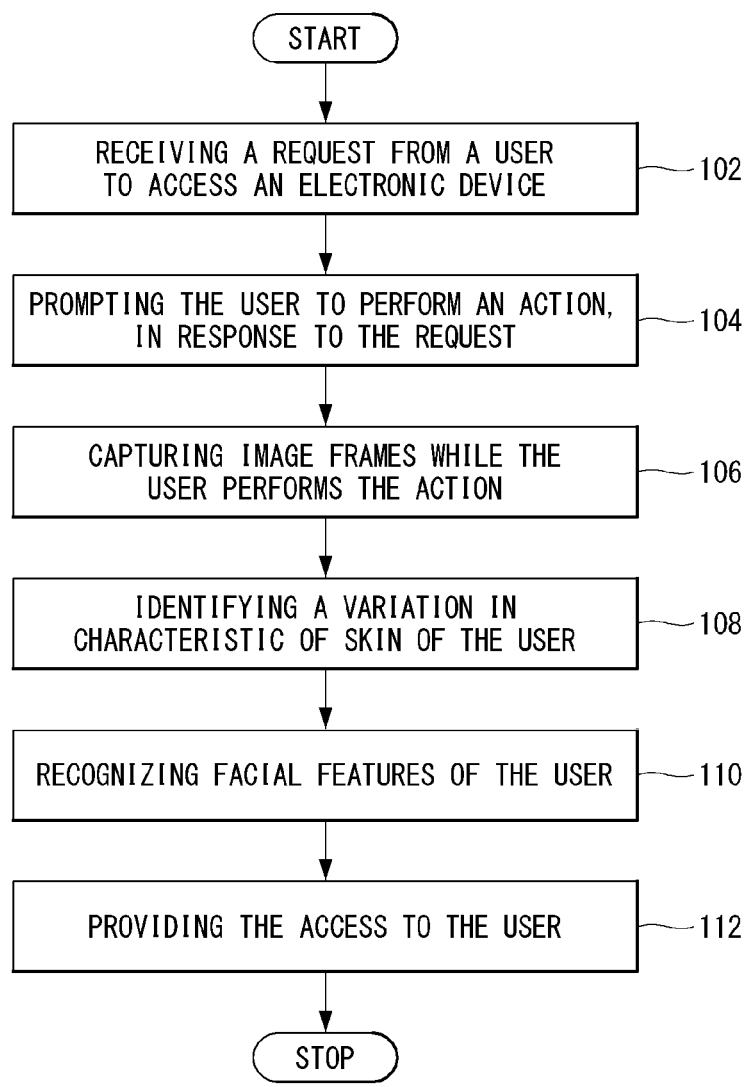
FIG. 1 is a flowchart illustrating a method for providing a secure access to an electronic device in accordance with an embodiment of the present disclosure.

FIG. 1 is a flowchart illustrating a method for providing a secure access to an electronic device in accordance with an embodiment of the present disclosure. At step 102, a request is received from a user to access an electronic device. In one or more embodiments of the preset disclosure, the 20 electronic device may be, without any limitation, a mobile terminal, a tablet, a handset, a security lock with camera, a money vending machine, a vehicle, and a financial transaction machine.

After receiving the request, at step 104, the user is prompted to perform one or more actions in response to the received request. In an embodiment of the present disclosure, the one or more actions may be selected from a plurality of predefined actions stored in a repository. The plurality of predefined actions may include, without any limitation, face movement in one or more directions, one or more predefined facial expressions, and speaking one or more predefined text strings. In an example, the one or more predefined facial expressions may include, without any limitation, raising eye brows, making a pout, winking of eyes and movement of mouth. Further, each predefined action of the plurality of the predefined actions corresponds to a predefined change in a predefined region of the skin of the user. The predefined change in the pre-defined region of the skin of the user may be stored in the repository. The repository may be located locally within the electronic device or may be located remotely with respect to the electronic device.

Further, the user may be prompted by a single type of prompt or a combination of prompts. For example, the user may be prompted, without any limitation, by an audio prompt, a visual prompt, or a combination thereof.

At step 106, one or more image frames are captured while the user performs the one or more actions prompted at step 104. In an embodiment of the present disclosure, capturing of the image frames terminates upon completion of the action performed by the user in a pre-defined time period.

At step 108, a variation in one or more characteristics of skin of the user is identified while the user performs the one more actions. The identification of the variation in the one or more characteristics of the skin of the user is based on the image frames captured at step 106. It may be apparent to a person of ordinary skill in the art that the variation in characteristic of the skin of the user is possible only when the variation is identified in live skin of the user. Accordingly, no variation in characteristics of the skin the user may be identified, if the user is wearing a face mask or spoofs of the live skin. The face mask may be made of artificial materials having characteristics different from the live skin. The artificial materials may be, without any limitation, silicon, plastic, polymer. Thus, the identification 5 of the variation in the one or more characteristics of the skin may facilitate in distinguishing between a live skin and a face mask.

In an embodiment of the present disclosure, the identification of the variation in the one more characteristics of the skin of the user includes pre-processing of the captured image frames. The pre-processing of the captured images facilities in determining a Region of Interest (ROI) on the skin corresponding to the one or more actions performed by the user. Further, the identification of the variation in the characteristics of skin of the user is based on identification of variation in characteristic of skin within the ROI. In an embodiment of the present disclosure, the capturing of the image frames terminates upon identification of the variation in the one or more characteristics of the skin of the user in a predefined time period. In another embodiment of the present disclosure, the variation in the characteristic of the skin within the ROI includes variation in physical characteristic of the skin within the ROI, chromatic characteristic of the skin within the ROI, or both.

In one embodiment of the present disclosure, the variation in the physical characteristic and the chromatic characteristic of the skin within the ROI may be identified in parallel. In another embodiment of the present disclosure, the variation in the physical characteristic and the chromatic characteristic of the skin within the ROI may be identified in a sequential manner. In yet another embodiment of the present disclosure, the sequential identification of the variation in the physical characteristic and the chromatic characteristic may be based on a predefined 5 time period.

Further, the variation in the physical characteristics of the skin within the ROI. while the user performs the action, may include at least one of: stretch in the skin, stress in muscles corresponding to the skin within the ROI, temporary wrinkles, skin shape deformation, change skin entropy, skin moisture, and the like. It may be apparent to a person of ordinary skill in the art that a user's face has various muscles beneath the skin. There is a contraction of the muscles and the skin while the user changes facial pose or performs an action. Further, plurality of muscles and different regions of the skin of the user are involved in facial movement, pose and performance of the actions. For example, if a user moves face towards left direction then muscles on right side of face i.e. on neck and lower jaw may get stressed. Further, muscles on the left side of the face i.e. on neck and lower jaw may develop temporary wrinkles. Some examples of facial muscles that may get involved during the action of the user may include Occipitofrontalis muscle (frontal and upper eye brow movement), Masseter muscle (jaw closing while speaking), Levator labii superioris. Zygomaticus major, Risorius, Orbicularis oris, Depressor anguli oris, Depressor labii inferioris, Platysma, Anterior belly of the digastrics, and the like.

Further in an embodiment of the present disclosure, the variation in the physical characteristic of the skin within the ROI may be identified by employing one or more image processing algorithms. These image processing algorithms process the captured image frames to identify the variation in the physical characteristic. In exemplary embodiments of the present disclosure, the image processing algorithms may include, without any limitation, Multicast AdaBoost algorithm, Support Vector Machine (SVM) algorithm, Active shape model algorithm, skin color segmentation using fuzzy entropy algorithm, and a combination thereof.

In another embodiment of the present disclosure, the variation in the physical characteristic of the skin within the ROI may be identified by employing deep learning algorithms. In exemplary embodiments of the present disclosure, the deep learning algorithms may include, without any limitation, machine learning, fuzzy logic, convolutional neural network, and recurrent neural network.

Further in an embodiment of the present disclosure, the variation in the chromatic characteristic of the skin within the ROI is identified by remote Photo PlethysmoGraphy (rPPG) analysis. The variation in the chromatic characteristic may be due to change in blood flow to the skin within the ROI during the action. Additionally, the chromatic characteristic of the skin includes coloration of the skin of the user in correspondence with one or more cardiac cycles of the user.

In an embodiment of the present disclosure, when no variation is identified in the characteristics of the skin of the user, the user is denied access to the electronic device.

In another implementation of the present disclosure, upon identification of the variation in the characteristics of the skin of the user, the method flows to step 110.

At step 110, facial features 5 of the user are recognized using the captured image frames. The facial features may be detected based on one of: facial feature geometry approach, facial feature template approach and facial feature invariant approach. In exemplary embodiments of the present disclosure, eyes, mouth, and nose may be used for facial feature geometry. Further, eyes, mouth, nose, and eye brows may be used for facial feature template. Furthermore, eyes and mouth may be used for facial feature invariant. Table 1 represents mechanisms that may be used for facial feature detection for each of the approach mentioned above.

TABLE 1

| Type of approach | Mechanism used |
| --- | --- |
| Facial feature geometry | Point distribution model |
|  | Gabor filters |
|  | Optical flow method |
| Facial feature template | Active shape model |
|  | Shape template |
|  | Eigen vector |
| Facial feature invariant | Space gray-level dependence |
|  | Matrix of face pattern |
|  | Mixture of Gaussian |

In an embodiment of the present disclosure, after the detection of facial features, facial features may be extracted based on geometry approach and appearance approach. Table 2 represents mechanisms used for facial feature extraction for each of the approach mentioned above.

| Type of approach | Mechanism used |
| --- | --- |
| Geometry approach | Geometric shaped facial feature extraction for Face recognition system |
|  | Pyramid Histogram of Orientation Gradients |
|  | Gabor feature based boosted classifiers |
|  | Enhanced Active shape model |
|  | Principal component Analysis |
|  | Point distribution model |
| Appearance approach | Local binary pattern |
|  | Gabor filters |
|  | Haar Wavelets |
|  | Facial Action coding system |

In an embodiment of the present disclosure, the extracted facial features may be classified after the facial feature extraction for facial feature recognition. In an example, mechanisms used for the feature classification may be learning vector quantization, support vector machine, convolutional neural networks, hidden Markov model, and Bayesian regularized recurrent network. It may be apparent to a person of ordinary skill in the art that in order to maintain brevity of the specification functional details of various algorithms mentioned in Table 1 and Table 2 have not been reproduced in the present disclosure.

Finally, when the facial features of the user are not recognized at step 110, the user is denied access to the electronic device. Upon successful recognition of the facial features of the user, at step 112, the user is provided access to the electronic device. In one or more embodiments of the present disclosure, the method may be used for diverse applications, such as locking/unlocking of smartphone, user authentication for any specific mobile application, security lock with camera for any premise, automatic access to home appliances, vehicle unlocking, vehicle engine ignition, secure financial transactions, and money dispensing machines.

The access provisioning mechanism, in accordance with the present disclosure, performs an additional verification of identifying if there is a variation in skin of the user while performing an action. The identification overcomes the drawback of conventional biometric credential based access mechanisms by eliminating a possibility of spoofing of facial features using a face mask, as the variation in the characteristics of the skin is observed for live skin of the user only. A face mask made of artificial material does not show variation in characteristics. Thus, once the probability of spoofed facial features is reduced, the access provisioning mechanism proceeds to recognition of facial features of an authorized user, similar to known biometric credential mechanisms. Since the access provisioning mechanism of the present disclosure provides a twostep mechanism of access to the electronic device, whereby probability of identity theft is reduced, the provisioning mechanism provides a secure access to the electronic device compared to conventional biometric credential based mechanisms.

Figure 2:
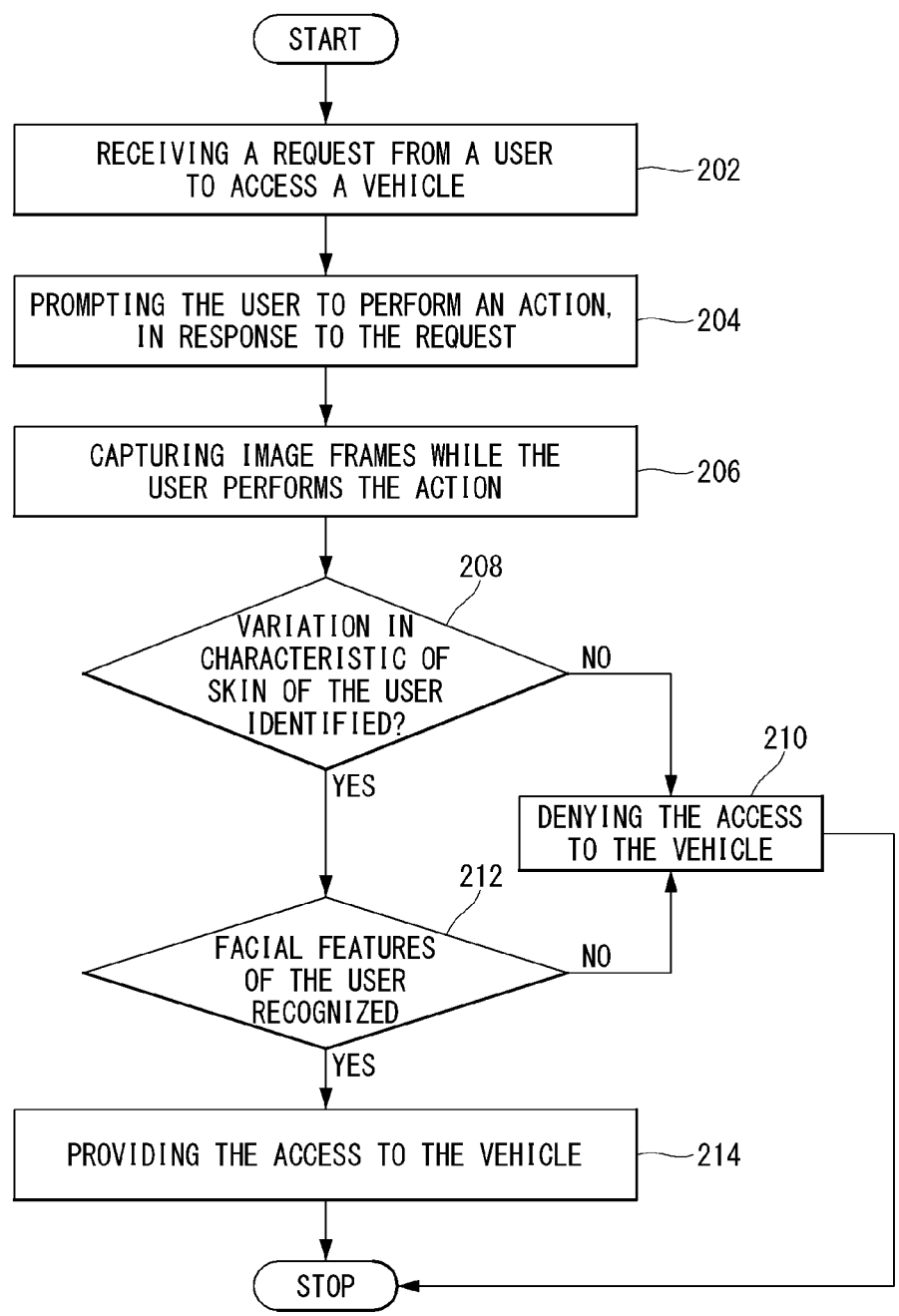
FIG. 2 is a flowchart illustrating a method for providing secure access to a vehicle in accordance with an exemplary embodiment of the present disclosure.

FIG. 2 is a flowchart illustrating a method for providing secure access to a vehicle in accordance with an exemplary embodiment of the present disclosure. The vehicle may be a car or any other vehicle. The access to the vehicle may correspond to allowing the user or driver to turn on the engine or start the vehicle. At step 202, a request is received from a user to start the vehicle.

After receiving the request, at step 204, the user is prompted to perform one or more actions in response to the received request. In an embodiment of the present disclosure, the one or more actions may be selected from a plurality of predefined actions stored in a repository. The plurality of predefined actions may include, without any limitation, face movement in one or more directions, one or more predefined facial expressions, and speaking one or more predefined text strings. In an example, the one or more predefined facial expressions may include, without any limitation, raising eye brows, making a pout, winking of eyes and movement of mouth. Further, each predefined action of the plurality of the predefined actions corresponds to a predefined change in a predefined region of the skin of the user. The predefined change in the pre-defined region of the skin of the user may be stored in the repository. The repository may be located locally within the electronic device or may be located remotely with respect to the electronic device.

Further, the user may be prompted by a single type of prompt or a combination of prompts. For example, the user may be prompted, without any limitation, by an audio prompt by music system of the vehicle, a visual prompt by display screen of the vehicle stereo, or a combination thereof.

At step 206, one or more image frames are captured while the user performs the one or more actions prompted at step 204. In an embodiment of the present disclosure, capturing of the image frames terminates upon completion of the action performed by the user in a pre-defined time period. In an example, the one or more image frames may be captured by a camera associated with the car.

At step 208, a variation in one or more characteristics of skin of the user is identified while the user performs the one more actions. The identification of the variation in the one or more characteristics of the skin of the user is based on the image frames captured at step 206.

In an embodiment of the present disclosure, the identification of the variation in the one more characteristics of the skin of the user includes pre-processing of the captured image frames. The pre-processing of the captured images facilities in determining a Region of Interest (ROI) on the skin corresponding to the one or more actions performed by the user.

Further, the identification of the variation in the characteristics of skin of the user is based on identification of variation in characteristic of skin within the ROI. In an embodiment of the present disclosure, the capturing of the image frames terminates upon identification of the variation in the one or more characteristics of the skin of the user in a predefined time period. In another embodiment of the present disclosure, the variation in the characteristic of the skin within the ROI includes variation in physical characteristic of the skin within the ROI, chromatic characteristic of the skin within the ROI, or both.

In one embodiment of the present disclosure, the variation in the physical characteristic and the chromatic characteristic of the skin within the ROI may be identified in parallel. In another embodiment of the present disclosure, the variation in the physical characteristic and the chromatic characteristic of the skin within the ROI may be identified in a sequential manner. In yet another embodiment of the present disclosure, the sequential identification of the variation in the physical characteristic and the chromatic characteristic may be based on a predefined time period.

Further, the variation in the physical characteristics of the skin within the ROI, while the user performs the action, may include at least one of: stretch in the skin, stress in muscles corresponding to the skin within the ROI, temporary wrinkles, skin shape deformation, change skin entropy, skin moisture, and the like.

Further in an embodiment of the present disclosure, the variation in the physical characteristic of the skin within the ROI may be identified by employing one or more image processing algorithms. These image processing algorithms process the captured image frames to identify the variation in the physical characteristic. In exemplary embodiments of the present disclosure, the image processing algorithms may include, without any limitation, Multicast AdaBoost algorithm, Support Vector Machine (SVM) algorithm, Active shape model algorithm, skin color segmentation using fuzzy entropy algorithm, and a combination thereof.

In another embodiment of the present disclosure, the variation in the physical characteristic of the skin within the ROI may be identified by employing deep learning algorithms. In exemplary embodiments of the present disclosure, the deep learning algorithms may include, without any limitation, machine learning, fuzzy logic, convolutional neural network, and recurrent neural network.

Further in an embodiment of the present disclosure, the variation in the chromatic characteristic of the skin within the ROI is identified by remote Photo PlethysmoGraphy (rPPG) analysis. The variation in the chromatic characteristic may be due to change in blood flow to the skin within the ROI during the action. Additionally, the chromatic characteristic of the skin includes coloration of the skin of the user in correspondence with one or more cardiac cycles of the user.

In an embodiment of the present disclosure, when no variation is identified in the characteristics of the skin of the user, the method moves to step 210 where the access to the vehicle is denied to the user.

In another implementation of the present disclosure, upon successful identification of the variation in the characteristics of the skin of the user, the method flows to step 212.

At step 212, facial features of the user are recognized using the captured image frames. The facial features may be detected based on one of: facial feature geometry approach, facial feature template approach and facial feature invariant approach. In exemplary embodiments of the present disclosure, eyes, mouth, and nose may be used for facial feature geometry. Further, eyes, mouth, nose, and eye brows may be used for facial feature template. Furthermore, eyes and mouth may be used for facial feature invariant.

Finally, when the facial features of the user are not recognized at step 212, the method moves to step 210 where the access to the vehicle is denied to the user. Upon successful recognition of the facial features of the user, at step 212, the method flows to step 214 where the access to the vehicle is provided to the user.

Figure 3:
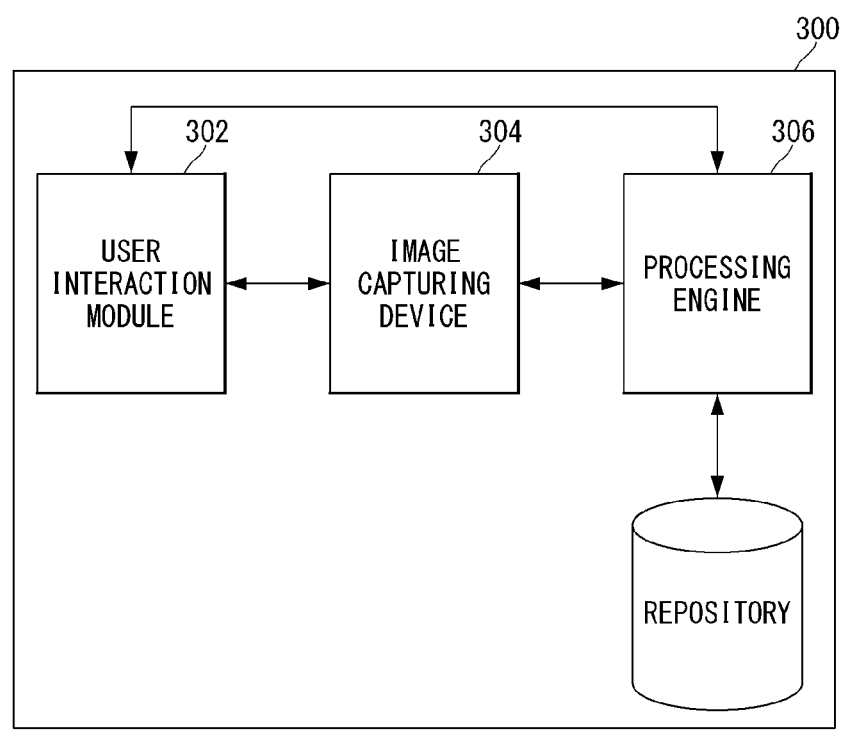
FIG. 3 is a block diagram illustrating a computer system for providing a secure access to an electronic device in accordance with another embodiment of the present disclosure.

FIG. 3 is a block diagram illustrating a computer system 300 for providing a secure access to an electronic device in accordance with an embodiment of the present disclosure. In an exemplary embodiment of the present disclosure, the computer system 300 may be implemented in diverse electronic devices. The electronic devices may be, without any limitation, a mobile terminal, a tablet, a handset, security locks with camera, money vending machines, vehicles, financial transaction machines. In an example, the computer system 300 may be integrated with the electronic device. In another example, the computer system 300 may be communicatively coupled to the electronic device.

In an embodiment of the present disclosure, the computer system 300 may include a microprocessor and a memory. In an example, the microprocessor and the memory may form a part a chipset installed in the electronic device. The microprocessor may be implemented as one or more microprocessors, microcomputers, microcontrollers, digital signal processors, central processing units, state machines, logic circuitries, and/or any devices that manipulate signals, based on operational instructions. Further, the microprocessor may be communicatively coupled to the memory. The memory may be implemented as a static memory or a dynamic memory. In an example, the memory may be internal to the computer system 300. In another example, the memory may be implemented as an external memory for the computer system 300.

In an embodiment of the present disclosure, the computer system 300 may also include a user interaction module 302, an image capturing device 304, and a processing engine 306. The user interaction module 302, the image capturing device 304, and the processing engine 306 may be communicatively coupled to the microprocessor and the memory. In an example, the user interaction module 302, the image capturing device 304, and the processing engine 306 may form part of the chipset on which the microprocessor and the memory are embedded. Further, the user interaction module 302, the image capturing device 304, and the processing engine 306 may be configured to perform operations and execute sub-routines to enable operation of the computer system 300, based on instructions provided by the microprocessor. In an example, the user interaction module 302, the image capturing device 304, and the processing engine 306 may be implemented as hardware, software or a combination thereof. Additionally, the user interaction module 302, the image capturing device 304, and the processing engine 306 may be associated with known hardware devices. For example, the user interaction module 302 may be associated with a user input/output device, such as a touch sensitive display screen, the processing engine 306 may be associated with the processor, and the image capturing device 304 may be associated with a camera.

In an embodiment of the present disclosure, the user interaction module 302, the image capturing device 304, and the processing engine 306 may be communicatively coupled to each other through a wired communication protocol. In another embodiment of the present subject matter, the user interaction module 302, the image capturing device 304, and the processing engine 306 may be communicatively coupled to each other through a wireless communication protocol.

In operation of the computer system 300 to facilitate a secure access to an electronic device the user interaction module 302 may receive, via the microprocessor, a request from a user to access the electronic device.

After receiving the request, the user interaction module 302 may prompt, via the microprocessor, the user to perform one or more actions in response to the request. In an embodiment of the present disclosure, the one or more actions may be selected from a plurality of predefined actions stored in a repository 308. The plurality of predefined actions may include, without any limitation, face movement in one or more directions, one or more predefined facial expressions, and speaking one or more predefined text strings. In an example, the one or more predefined facial expressions may include, without any limitation, raising eye brows, making a pout, winking of eyes and movement of mouth. Further, each predefined action of the plurality of the predefined actions corresponds to a predefined change in a pre-defined region of the skin of the user. The predefined change in the pre-defined region of the skin of the user may be stored in the repository 308. The repository 308 may be located locally within the electronic device or may be located remotely with respect to the electronic device.

Further, the user may be prompted by a single type of prompt or a combination of prompts. For example, the user may be prompted, without any limitation, by an audio prompt, a visual prompt, or a combination thereof.

Next, the image capturing device 304 may capture one or more image frames while the user performs the one or more action. In an embodiment of the present disclosure, capturing of the image frames terminates upon completion of the action performed by the user in a pre-defined time period.

In an embodiment of the present disclosure, the processing engine 306 may identify, via the microprocessor, a variation in the one or more characteristics of the skin of the user while the user performs the one or more action, using the one or more image frames captured by the image capturing device 304.

In an embodiment of the present disclosure, the processing engine 306 identifies the variation in the one or more characteristics of skin of the user by pre-processing of the one or more captured image frames to determine a Region of Interest (ROI) in the skin corresponding to the one or more actions performed by the user. Further, the processing engine 306 identifies the variation in the one or more characteristics of skin of the user based on identification of variation in characteristic of the skin within the ROI.

In an exemplary embodiment, the image capturing device 304 terminates capturing of the image frames upon completion of identification of variation in the characteristics of the skin of the user in a pre-defined 5 time period.

In an embodiment of the present disclosure, the variation in the characteristic of the skin within the ROI includes variation in physical characteristic of the skin within the ROI, chromatic characteristic of the skin within the ROI, or both.

In one embodiment, the variation in the physical characteristic of the skin within the ROI may include one of: stretch in the skin, stress in muscles corresponding to the skin within the ROI, and temporary wrinkles on the skin, skin shape deformation, change skin entropy, skin moisture, and the like.

Further, the processing engine 306 may identify the variation in the physical characteristic of the skin within the ROI by employing one or more image processing algorithms. These image processing algorithms process the captured image frames to identify the variation in the physical characteristic. In exemplary embodiments of the present disclosure, the image processing algorithms may include, without any limitation, Multicast AdaBoost algorithm, Support Vector Machine (SVM) algorithm, Active shape model algorithm, skin color segmentation using fuzzy entropy algorithm, and a combination thereof.

In another embodiment of the present disclosure, the processing engine 306 may identify the variation in the physical characteristic of the skin within the ROI by employing one or more deep learning algorithms, such as machine learning, fuzzy logic, convolutional neural network, and recurrent neural network.

In an embodiment of the present disclosure, the processing engine 306 may identify the variation in the chromatic characteristic by remote Photo PlethysmoGraphy (rPPG) analysis. The chromatic characteristic of the skin includes coloration of the skin of the user in correspondence with one or more cardiac cycles of the user.

In an embodiment of the present disclosure, the processing engine 306 may recognize, via the microprocessor, facial features of the user upon identification of the variation in the one or more characteristics of the skin of the user. Further, the processing engine 306 may facilitate, via the microprocessor, the access to the electronic device to the user based on the recognition of the facial features.

The computer system 300, in accordance with the present disclosure, performs an additional verification of identifying if there is a variation in skin of the user while performing an action. The identification overcomes the drawback of conventional biometric credential based access mechanisms, by eliminating a possibility of spoofing of facial features using a face mask, as the variation in the characteristics of the skin is observed for live skin of the user only. A face mask made of artificial material does not show variation in characteristics. Once, the probability of spoofed facial features is reduced, the computer system 300 proceeds to recognition of facial features of an authorized user, similar to known biometric credential mechanisms. Since, the computer system 300 of the present disclosure provides a two step mechanism of access to the electronic device, whereby probability of identity theft is reduced, the computer system 300 facilitates a secure access to the electronic device compared to conventional biometric credential based mechanisms.

In an embodiment of the present disclosure a computer system (300) to facilitate secure access to an electronic device, the computer system 300 comprising a microprocessor and a memory (302), the computer system 300 further comprising: a user interaction module (302) configured to: receive, via the microprocessor, a request from a user to access the electronic device; prompt, via the microprocessor, the user to perform at least one action in response to the request; an image capturing device (304) configured to capture one or more image frames while the user performs the at least one action; a processing engine (306) configured to: identify, via the microprocessor, a variation, using the one or more image frames, in one or more characteristics of skin of the user while the user performs the at least one action; recognize, via the microprocessor, one or more facial features of the user upon identification of the variation in the at least one characteristic of the skin of the user; and facilitate, via the microprocessor, the access to the user based on recognition of the one or more facial features.

Wherein the prompt may be at least one of: audio prompt and visual prompt.

Wherein the at least one action may be selected from a plurality of predefined actions stored in a repository (308).

Wherein the plurality of predefined actions may include face movement in one or more directions, one or more predefined facial expressions and speaking one or more predefined text strings.

Wherein the one or more predefined facial expressions may include raising eye brows, making a pout, winking of eyes and movement of mouth.

Wherein each predefined action of the plurality of the predefined actions corresponds to a predefined change in a pre-defined region of the skin of the user, further wherein the predefined change in a pre-defined region of the skin of the user is stored in the repository (308).

Wherein the processing engine (306) may identify the variation in one or more characteristics of skin of the user by pre-processing of the one or more captured image frames to determine a Region of Interest (ROI) corresponding to the at least one action performed by the user.

Wherein the processing engine 306 may identify the variation in one or more characteristics of skin of the user based on identification of variation in characteristic of the skin within the ROI.

Wherein the image capturing device (304) may terminate capturing of the one or more image frames upon completion of one of: identification of variation in the one or more characteristics of the skin of the user and the at least one action performed by the user.

Wherein the image capturing device (304) may terminate the capturing of the one or more image frames in a pre-defined time period.

Wherein the variation in the characteristic of the skin within the ROI may include variation in at least one of: physical characteristic and chromatic characteristic of the skin within the ROI.

Wherein the processing engine (306) may identify the variation in the physical characteristic of the skin within the ROI by at least one of: Multicast AdaBoost algorithm and Support Vector Machine (SVM) algorithm, Active shape model and SVM algorithm, skin color segmentation using fuzzy entropy algorithm, and a combination thereof.

Wherein the processing engine (306) may identify the variation in physical characteristic of the skin within the ROI by employing one or more deep learning algorithms and wherein the one or more deep learning algorithms include machine learning, fuzzy logic, convolutional neural network, and recurrent neural network.

Wherein the variation in physical characteristic of the skin within the ROI may include at least one of: stretch in the skin, stress in muscles corresponding to the skin within the ROI, and temporary wrinkles on the skin.

Wherein the processing engine (306) may employ remote Photo Plethysmo Graphy (rPPG) analysis to identify the variation in the chromatic characteristic of the skin of the user and wherein the chromatic characteristic of the skin includes coloration of the skin of the user in correspondence with at least one cardiac cycle of the user.

Wherein the user interaction module (302), the image capturing device (304), and the processing engine (306) may be communicatively coupled to each other through one of: a wired communication protocol and a wireless communication protocol.

In an embodiment of the present disclosure a mobile terminal to facilitate secure access to an electronic device. The mobile terminal further comprising: a touch sensitive display screen configured to: receive, via the microprocessor, a request from a user to access the electronic device; prompt, via the microprocessor, the user to perform at least one action in response to the request. The mobile terminal further comprises a camera configured to capture one or more image frames while the user performs the at least one action. The mobile terminal further comprises a processor configured to: identify a variation, using the one or more image frames, in one or more characteristics of skin of the user while the user performs the at least one action; recognize one or more facial features of the user upon identification of the variation in the at least one characteristic of the skin of the user: and facilitate the access to the user based on recognition of the one or more facial features.

Wherein the prompt is at least one of audio prompt or visual prompt.

Wherein the at least one action is selected from a plurality of predefined actions stored in a repository, wherein the plurality of predefined actions include face movement in one or more directions, one or more predefined facial expressions and speaking one or more predefined text strings.

Wherein the one or more predefined facial expressions include raising eye brows, making a pout, winking of eyes and movement of mouth.

Wherein each predefined action of the plurality of the predefined actions corresponds to a predefined change in a pre-defined region of the skin of the user, further wherein the predefined change in a pre-defined region of the skin of the user is stored in the repository (308).

Wherein the processor identifies the variation in one or more characteristics of skin of the user by pre-processing of the one or more captured image frames to determine a Region of Interest (ROI) corresponding to the at least one action performed by the user.

Wherein the processor identifies the variation in one or more characteristics of skin of the user based on identification of variation in characteristic of the skin within the ROI.

Wherein the camera terminates capturing of the one or more image frames upon completion of one of: identification of variation in the one or more characteristics of the skin of the user and the at least one action performed by the user.

Wherein the camera terminates the capturing of the one or more image frames in a pre-defined time period.

Wherein the variation in the characteristic of the skin within the ROI includes variation in at least one of: physical characteristic and chromatic characteristic of the skin within the ROI.

Wherein the processor identifies the variation in the physical characteristic of the skin within the ROI by at least one of: Multicast AdaBoost algorithm and Support Vector Machine (SVM) algorithm, Active shape model and SVM algorithm, skin color segmentation using fuzzy entropy algorithm, and a combination thereof.

Wherein the processor identifies the variation in physical characteristic of the skin within the ROI by employing one or more deep learning algorithms and wherein the one or more deep learning algorithms include machine learning, fuzzy logic, convolutional neural network, and recurrent neural network.

Wherein the variation in physical characteristic of the skin within the ROI includes at least one of: stretch in the skin, stress in muscles corresponding to the skin within the ROI, and temporary wrinkles on the skin.

Wherein the processor employs remote Photo Plethysmo Graphy (rPPG) analysis to identify the variation in the chromatic characteristic of the skin of the user and wherein the chromatic characteristic of the skin includes coloration of the skin of the user in correspondence with at least one cardiac cycle of the user.

Wherein the touch sensitive display screen, the camera, and the processor are communicatively coupled to each other through one of: a wired communication protocol and a wireless communication protocol.

We claim:

1. A computer implemented method for providing a secure access to an electronic device, the computer implemented method comprising:
   receiving a request from a user to access the electronic device;
   prompting the user to perform at least one action in response to the received request;
   capturing one or more image frames while the user performs the at least one action;
   identifying a variation, using the one or more image frames, in one or more characteristics of skin of the user while the user performs the at least one action;
   recognizing one or more facial features of the user upon identification of the variation in the at least one characteristic of the skin of the user; and
   providing the access to the user based on recognition of the one or more facial features,
   wherein the identification of the variation in one or more characteristics of the skin of the user includes pre-processing of the one or more captured image frames to determine a Region of Interest (ROI) corresponding to the at least one action performed by the user,
   wherein the identification of the variation in one or more characteristics of skin of the user is based on identification of variation in characteristic of skin within the ROI,
   wherein the variation in the characteristic of the skin within the ROI includes variation in at least one of: physical characteristic or chromatic characteristic of the skin within the ROI, and
   wherein the variation in the chromatic characteristic is identified by remote Photo PlethysmoGraphy (rPPG) analysis and further wherein the chromatic characteristic of the skin includes coloration of the skin of the user in correspondence with one or more cardiac cycle of the user.

2. The computer implemented method as claimed in claim 1, wherein the prompting is by at least one of: audio prompt or visual prompt.

3. The computer implemented method as claimed in claim 1, wherein the at least one action is selected from a plurality of predefined actions stored in a repository.

4. The computer implemented method as claimed in claim 3, wherein the plurality of predefined actions include face movement in one or more directions, one or more predefined facial expressions, and speaking one or more predefined text strings.

5. The computer implemented method as claimed in claim 4, wherein the one or more predefined facial expressions include raising eye brows, making a pout, winking of eyes and movement of mouth.

6. The computer implemented method as claimed in claim 3, wherein each predefined action of the plurality of the predefined actions corresponds to a predefined change in a predefined region of the skin of the user, further wherein the predefined change in the pre-defined region of the skin of the user is stored in the repository.

7. The computer implemented method as claimed in claim 1, wherein the capturing of the one or more image frames terminates upon completion of one of: identification of variation in the one or more characteristics of the skin of the user and the at least one action performed by the user.

8. The computer implemented method as claimed in claim 7, wherein the termination of the capturing of the one or more image frames occurs in a pre-defined time period.

9. The computer implemented method as claimed in claim 1, wherein the variation in the physical characteristic of the skin within the ROI is identified by at least one of: Multicast AdaBoost algorithm, Support Vector Machine (SVM) algorithm, Active shape model algorithm, skin color segmentation using fuzzy entropy algorithm, or a combination thereof.

10. The computer implemented method as claimed in claim 1, wherein the variation in the physical characteristic of the skin within the ROI is identified by employing one or more deep learning algorithms and further wherein the one or more deep learning algorithms include machine learning, fuzzy logic, convolutional neural network, and recurrent neural network.

11. The computer implemented method as claimed in claim 1, wherein the variation in the physical characteristic of the skin within the ROI includes at least one of: stretch in the skin, stress in muscles corresponding to the skin within the ROI, or temporary wrinkles on the skin.

12. A mobile terminal to facilitate secure access to an electronic device, the mobile terminal comprising:
   a touch sensitive display screen configured to:
   receive, via a microprocessor, a request from a user to access the electronic device;
   prompt, via the microprocessor, the user to perform at least one action in response to the request;
   a camera configured to capture one or more image frames while the user performs the at least one action; and
   a processor configured to:
   identify a variation, using the one or more image frames, in one or more characteristics of skin of the user while the user performs the at least one action;
   recognize one or more facial features of the user upon identification of the variation in the at least one characteristic of the skin of the user; and
   facilitate the access to the user based on recognition of the one or more facial features,
   wherein the processor pre-processes the one or more captured image frames to determine a Region of Interest (ROI) corresponding to the at least one action performed by the user,
   wherein the identification of the variation in one or more characteristics of skin of the user is based on identification of variation in characteristic of skin within the ROI,
   wherein the variation in the characteristic of the skin within the ROI includes variation in at least one of: physical characteristic or chromatic characteristic of the skin within the ROI, and
   wherein the variation in the chromatic characteristic is identified by remote Photo PlethysmoGraphy (rPPG) analysis and further wherein the chromatic characteristic of the skin includes coloration of the skin of the user in correspondence with one or more cardiac cycle of the user.

13. The mobile terminal as claimed in claim 12, wherein the prompt is at least one of: audio prompt or visual prompt.

14. The mobile terminal as claimed in claim 12, wherein the at least one action is selected from a plurality of predefined actions stored in a repository, and
   wherein the plurality of predefined actions include face movement in one or more directions, one or more predefined facial expressions and speaking one or more predefined text strings.

15. The mobile terminal as claimed in claim 14, wherein the one or more predefined facial expressions include raising eye brows, making a pout, winking of eyes and movement of mouth.

16. The mobile terminal as claimed in claim 14, wherein each predefined action of the plurality of the predefined actions corresponds to a predefined change in a pre-defined region of the skin of the user, further wherein the predefined change in a pre-defined region of the skin of the user is stored in the repository.

* * * * *